United States Patent [19]
Liebenow

[11] Patent Number: 6,012,146
[45] Date of Patent: Jan. 4, 2000

[54] PASSWORD PROTECTION FOR REMOVABLE HARD DRIVE

[75] Inventor: Frank W. Liebenow, Greer, S.C.

[73] Assignee: NCR Corporation, Dayton, Ohio

[21] Appl. No.: 08/925,429

[22] Filed: Sep. 8, 1997

Related U.S. Application Data

[63] Continuation of application No. 08/549,502, Oct. 27, 1995, abandoned.

[51] Int. Cl.⁷ .................................................. G06F 15/00
[52] U.S. Cl. ........................................................ 713/202
[58] Field of Search .............................. 395/188.01, 186, 395/187.01; 380/3, 4

[56] References Cited

U.S. PATENT DOCUMENTS

| | | | |
|---|---|---|---|
| 3,890,601 | 6/1975 | Pietrolewicz | 340/172.5 |
| 4,742,448 | 5/1988 | Sander et al. | 364/200 |
| 4,752,068 | 6/1988 | Endo | 273/1 E |
| 4,833,554 | 5/1989 | Dalziel et al. | 360/98.04 |
| 4,851,937 | 7/1989 | Sander | 360/69 |
| 4,864,542 | 9/1989 | Oshima et al. | 365/189.01 |
| 5,012,514 | 4/1991 | Renton | 380/4 |
| 5,027,396 | 6/1991 | Platteter et al. | 380/4 |
| 5,041,924 | 8/1991 | Blackborow et al. | 360/69 |
| 5,159,182 | 10/1992 | Eisele | 235/492 |
| 5,210,795 | 5/1993 | Lipner et al. | 380/23 |
| 5,214,550 | 5/1993 | Chan | 360/97.01 |
| 5,237,609 | 8/1993 | Kimura | 380/3 |
| 5,243,495 | 9/1993 | Read et al. | 361/685 |
| 5,253,129 | 10/1993 | Blackborow et al. | 360/69 |
| 5,253,133 | 10/1993 | Guo | 360/97.01 |
| 5,280,398 | 1/1994 | Wade et al. | 360/60 |
| 5,280,403 | 1/1994 | Martin | 360/133 |
| 5,282,247 | 1/1994 | McLean et al. | 380/4 |
| 5,305,180 | 4/1994 | Mitchell et al. | 361/685 |
| 5,317,468 | 5/1994 | Wakabayashi et al. | 360/135 |
| 5,327,308 | 7/1994 | Hanson | 360/97.01 |
| 5,339,444 | 8/1994 | Nakajima | 395/750 |
| 5,371,792 | 12/1994 | Asai et al. | 380/3 |
| 5,375,243 | 12/1994 | Parzych et al. | 395/725 |
| 5,469,564 | 11/1995 | Junya | 395/188.01 |
| 5,530,677 | 6/1996 | Grover et al. | 365/233 |
| 5,533,125 | 7/1996 | Bensimon et al. | 380/4 |

FOREIGN PATENT DOCUMENTS

| | | | |
|---|---|---|---|
| 432 333 A1 | 6/1991 | European Pat. Off. | G06F 1/00 |
| WO 95/14265 | 5/1995 | United Kingdom | G06F 1/00 |

*Primary Examiner*—Robert W. Beausoliel, Jr.
*Assistant Examiner*—Pierre Eddyelisca
*Attorney, Agent, or Firm*—Rothwell, Figg, Ernst & Kurz

[57] ABSTRACT

A device and method for preventing access to data on a hard drive in which a first password is stored on the hard drive so that it is not accessible from a system in which the hard drive is installed, and in which a second password is provided from the system. A comparison of the two passwords is made in a processor in the hard drive to determine whether the two passwords are the same. If the result of the comparison of the first and second passwords is that the two passwords are not the same, access to the hard drive is denied.

22 Claims, 1 Drawing Sheet

PASSWORD PROTECTION FOR REMOVABLE HARD DRIVE

This is a continuation of application Ser. No. 08/549,502, filed Oct. 27, 1995, now abandoned.

BACKGROUND OF THE INVENTION

The present invention relates to methods and devices for controlling access to data, and more particularly to a method and device for preventing unauthorized access to data on a hard drive, regardless of the system in which the hard drive is installed and the password protection available in the system.

As is known, stored data on a data storage device may be protected from unauthorized access in various ways. For example, an operating system program resident in a system in which the data storage device installed may provide password protection. (The term "password" refers to a sequence of characters in a defined format that is desirably kept secret and used for controlling access to data.) Password protection programs prompt a would-be user to provide a password and deny access unless the user enters a password which matches a predetermined password located in non-volatile memory in the system (i.e., a storage medium which does not lose its contents when system power is removed, such as C-MOS, flash memory, and hard disks). However, these methods are easily bypassed by erasing the non-volatile memory and thus the password protection (e.g., clearing the C-MOS memory by removing the associated battery) or by simply removing the data storage device (e.g., hard drive, floppy disk, PCMCIA memory card, etc.) from the password protected system and installing the data storage device in a non-password protected system.

This problem has been exacerbated by recent technology advances. Data storage devices have become smaller and more easily moved from one system to the next, and many laptop and notebook computers use standard data storage devices, such as Intelligent Drive Electronics (IDE) hard drives, that are purposely engineered to be easily moved from one laptop or notebook computer to the next. It is clearly desirable to provide protection for data stored on a removable data storage device that is independent of the system in which it is installed. It would be a further advantage to be able to use existing technology with only slight modifications to preserve the investments made therein.

Accordingly, it is an object of the present invention to provide a novel device and method for controlling access to data stored on a removable data storage device which obviates the problems of the prior art.

It is another object of the present invention to provide a novel device and method for protecting data on a data storage device in which protection is afforded when a password is detected at a predetermined location on a storage medium in the data storage device.

It is yet another object of the present invention to provide a novel device and method for controlling access to data on a hard drive capable of being used in any of plural systems without regard to the access protection afforded by the system to which the hard drive is connected.

It is still another object of the present invention to provide a novel method of selectively protecting data on a storage medium in a data reader that is in a system in which the data reader compares a password from the system to a password stored on the storage medium (and which is accessible only from the data reader) and generates an enabling signal for allowing access to the storage medium if the passwords are the same.

It is a further object of the present invention to provide a novel method of selectively protecting data on a storage medium in a data reader in a system in which a password stored in the system device is automatically provided to the data reader for comparison to a first password stored in the storage medium after access to the data on the hard drive has been denied.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
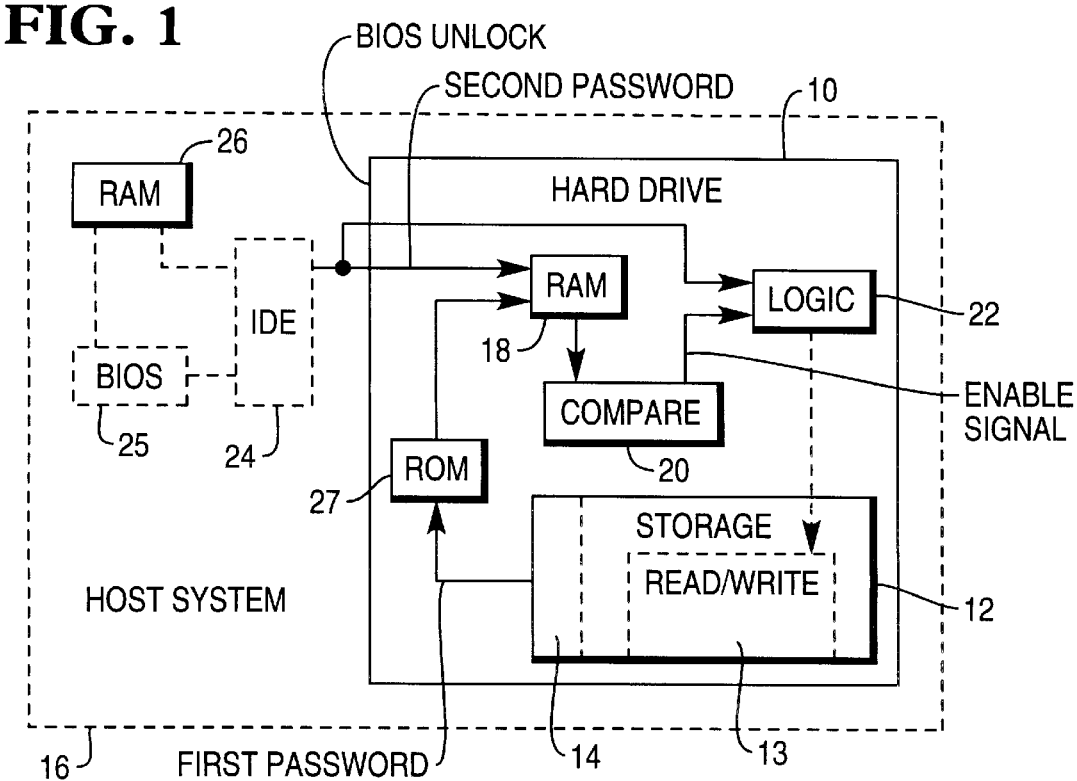
FIG. 1 is a block diagram of an embodiment of the present invention.

With reference to FIG. 1, an embodiment of the present invention may include a hard drive 10 with a storage medium 12 for storing data which has a unit 13 for reading and writing data and a predetermined storage location 14 for storing a first password, storage location 14 not being accessible from a host system 16 in which hard drive 10 may be installed. Hard drive 10 may also include a memory (e.g., RAM) 18 for receiving a second password from system 16, a comparator 20 for comparing the first and second passwords and for providing an enable signal when the first and second passwords are the same, and a logic circuit 22 for receiving the enable signal and denying access to storage medium 12 from system 16 in the absence of the enable signal.

Hard drive 10 may include discrete components for accomplishing the functions set forth above, or preferably may include specifically configured firmware in conventional components for accomplishing the functions. System 16, which may be conventional, may include a data request interface 24 (typically an Intelligent Drive Electronics—IDE—interface, although the invention is not limited to IDE devices) for providing a request for access to data on storage medium 12.

By way of further explanation, the first password may be stored in location 14 in storage medium 12 in non-volatile memory. While any number of non-volatile memory options are available and known in the art, preferably the first password is stored on platters (storage media) of the hard drive in a reserved location 14 not accessible from interface 24. This may be accomplished in a manner similar to that currently used by many 2.5" and 3.5" hard drives for storing drive firmware on hidden tracks of the platters. As will be appreciated by those of skill in the art, "hidden tracks" refers to the inability of interface 24 to access the tracks but does not refer to the ability of hard drive 10 to access those tracks.

The presence of a password in storage location 14 provides the initial access control. If a password is found there, access will not be granted until an enable signal has been provided. If storage location 14 is blank (i.e., does not include a sequence of characters that meets a definition of a password), the hard drive is unprotected and behaves as any other unprotected drive, providing data on request.

A BIOS 25 in system 16 may be used to provide the second password to hard drive 10 from interface 24 along with an unlock command. BIOS 25 may prompt the user to enter the second password during power-up. The unlock command informs hard drive 10 that the second password is now available to it, and that it should load the second password into RAM 18 in preparation for the comparison of the two passwords in comparator 20. It is noted that there currently is no unlock command in the typical IDE interface command set, and one may be added conventionally.

The second password may be stored in a volatile memory 26 in system 16, such as a RAM where stored contents are lost in the absence of power. When access to data on hard drive 10 has been granted and then subsequently denied (e.g., when power to the hard drive is interrupted, such as when the hard drive powers down for energy conservation and the enable signal is lost), the second password must be provided again to the hard drive in order to access data. When power is returned to the hard drive, BIOS 25 checks RAM 26 for the presence of a second password and automatically provides the stored second password to the hard drive for comparison with the first password in the manner described above. Alternatively, BIOS 25 may ask the user to provide the second password each time.

The BIOS 25 may be used to provide a new first password to hard drive 10 through interface 24 with an appropriate command, such as "set password", which tells hard drive 10 to store the new first password in location 14. Once the first password has been stored, data on storage medium 12 cannot be accessed until the BIOS generated unlock command is presented to logic unit 22 from IDE 24 along with the (proper) second password so that the enable signal may be provided.

Comparator 20 in hard drive 10 may compare the first and second passwords to determine whether they are the same. Firmware in a Read Only Memory (ROM) 27 may load the first password into RAM 18, and comparator 20 (e.g., a microprocessor on-board the hard drive) may then compare the first and second passwords from RAM 18. Operation of comparator 20 may be conventional and may be embodied in firmware, with a preferred embodiment including a character-by-character comparison to determine equality. If the two passwords are the same, comparator 20 provides an enable signal to logic unit 22. Further security restrictions may be imposed on the choice of passwords, such as length, and selection of characters that are known to force users to create passwords that are harder to guess.

Figure 2:
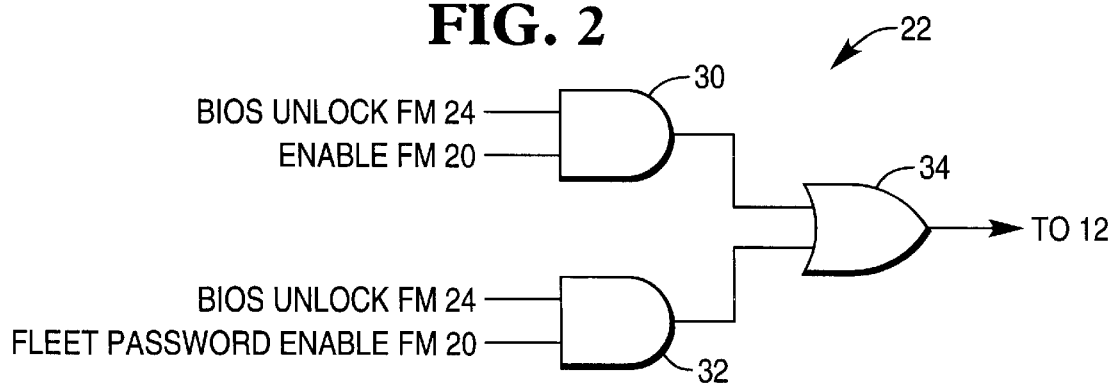
FIG. 2 is an embodiment of a logic unit of the present invention which provides an access-controlling signal.

The operation of logic unit 22 may be understood with reference to FIG. 2 which depicts an embodiment of the unit, although it is to be understood that the logic unit of FIG. 2 is but an example and that other embodiments of the logic unit may be used, including firmware in hard drive electronics. An AND gate 30 may receive the unlock signal from BIOS and the enable signal (indicating that the two passwords are the same) from comparator 20. For example, if TRUE is used to indicate access has been requested and permitted, and both inputs to gate 30 are TRUE, the appropriate access-controlling signal may be provided to unlock storage medium 12.

Figure 3:
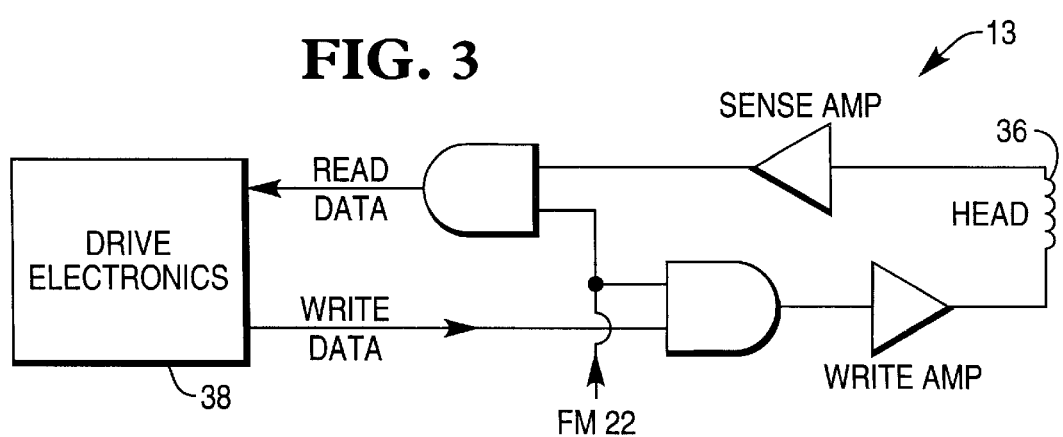
FIG. 3 is an embodiment of an access-controlling device in a hard drive of the present invention.

Locking and unlocking of storage medium 14 may be accomplished in several ways. Preferably unauthorized read and write requests may be refused by firmware in hard drive electronics which returns an appropriate error code indicating access has been denied. In a further embodiment of an access-controlling mechanism illustrated in FIG. 3, access may be controlled by restricting the flow of data in one or both directions between the drive's read/write head 36 and hard drive electronics 38.

While the foregoing embodiment refers to an IDE interface, the invention may also be used with other types of interfaces, including without limitation a Serial Communication Standard Interface (SCSI), and a Fast IDE Interface. Further, the invention also finds application in data storage devices other than hard drives, and use of the term hard drive herein refers to data storage devices, such PCMCIA memory cards and the like, that can be adapted to have a "hidden" location for storing the first password and an incorporated data reader for reading the contents of that location so that the first password does not have to be read—and possibly compromised—by the system in which the data storage device is installed.

In a further embodiment of the present invention a fleet password for accessing plural storage media may be used in the same manner as described above. A fleet password may be established and retained by a system administrator to provide an alternative means of accessing data on a restricted storage medium if the above-described second password is lost. A first fleet password common to a plurality of hard drives 10 may be stored in location 14 with the first password and may be compared to a second fleet password in the manner discussed above. For example, logic unit 22 may include an additional AND gate 32 which has as one input the result of the comparison of the first and second fleet passwords and as the other input a BIOS generated unlock signal. The outputs of gates 30 and 32 may be provided to OR gate 34 which provides the appropriate signal to control access to storage medium 12. In operation, the second password may be compared to the first password, and if it does not match a further comparison may be made to the first fleet password. If the second password matches either, access would be granted.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of preventing unauthorized access to data on a hard drive that is movable from one system having an access restrictor which permits access to the data on the hard drive only through use of a password to another system in which the data on the hard drive would have been accessible without providing the password, the method comprising the steps of:

(a) providing a movable hard drive which has means for preventing access to the data on the hard drive;

(b) storing a first password on the hard drive so that the first password is not accessible from a system in which the hard drive is installed;

(c) providing a second password from the system in which the hard drive is installed to the hard drive;

(d) making a comparison in the hard drive of the first and second passwords to determine whether the two passwords are the same;

(e) preventing access to the data on the hard drive if the result of the comparison of the first and second passwords is that the two passwords are not the same;

(f) granting access to the data on the hard drive if the comparison indicates that the two passwords are the same, and storing the second password in the system in which the hard drive is installed so that the second password remains stored only so long as the system in which the hard drive is stored remains powered; and (g) automatically providing said second password to said hard drive for comparison if access to the data on the hard disk is subsequently prevented after having been granted.

2. The method of claim 1 wherein the storing of the second password in step (f) further comprises temporarily storing the second password in random access memory in the system in which the hard drive is installed.

3. The method of claim 1 wherein the step of storing the first password comprises the steps of:

partitioning a storage medium in the hard drive into a hidden area not accessible from the system in which the hard drive is installed and a data storage area; and storing the first password in the hidden area.

4. The method of claim 1 where the step of making a comparison comprises the steps of:

loading the first password into a RAM in the hard drive under the control of instructions from a ROM in the hard drive;

comparing the first and second passwords in a microprocessor in the hard drive; and providing an enable signal if the result of the comparison is that the two passwords are the same.

5. The method of claim 4 where the step of preventing access comprises the steps of providing an unlock signal from the system in which the hard drive is installed; and preventing access to the data in the absence of one of the unlock signal and the enable signal.

6. The method of claim 1 where the step of preventing access comprises the steps disabling communication of read/write data between a read/write head in the hard drive and hard drive electronics.

7. The method of claim 1 further comprising the steps of:

storing a first fleet password on plural ones of the hard drive so that the fleet password is not accesible from systems in which the plural hard drives are installed;

providing a second fleet password from one of the systems in which the plural hard drives are installed to one or more of the plural ones of the hard drive installed in the providing system;

making a comparison in the one or more of the plural ones of the hard drive installed in the providing system of the first fleet password and the second fleet password to determine whether the two fleet passwords are the same.

8. The method of claim 1 wherein the system in which the hard drive is installed has an interface for communicating with the hard drive, and wherein the method further comprises the steps of:

providing the second password to the interface; and providing an unlock command to the hard drive from the interface as a necessary prerequisite for step (d).

9. A method of selectively protecting data on a storage medium in a data reader that is in a system, the method comprising the steps of:

(a) determining with the data reader whether a predetermined storage location on the storage medium is blank;

(b) disabling access to the storage medium if the storage location is not blank and in the absence of an enable signal;

(c) sending a password from the system to the data reader;

(d) comparing on the data reader the password to a content of the storage location;

(e) generating on the data reader an enable signal for allowing access to the storage medium if the password favorably compares to the contents;

(f) storing the password in the system only as long as the system remains powered; and (g) automatically providing the password stored in the system to the data reader for comparison if the enable signal is lost.

10. The method of claim 9 further comprising the step of storing the password in the storage location of the storage medium if the storage location is blank.

11. The method of claim 9 further comprising the step of changing the content of the storage location after the step of generating the enable signal.

12. A method of controlling access to data on a removable data storage device that is useable in any one of plural systems for processing the data accessed from the data storage device, the method comprising the steps of:

(a) storing a first password on the data storage device so that the first password can only be accessed by the data storage device;

(b) providing a second password to the data storage device from a one of the systems which is seeking access to the data on the data storage device;

(c) comparing on the data storage device the first and second passwords;

(d) permitting access to the data on the data storage device from the one of the systems and storing the second password on the one of the systems only as long as the one of the systems remains powered if the first and second passwords are the same; and (e) automatically providing the second password to the data storage device from the one of the systems if access to the data on the storage device is subsequently denied after having been permitted, whereby permission to access the data on the data storage device from any of the plural systems for processing the data on the data storage device is granted only by the data storage device.

13. The method of claim 12 wherein the step of storing the first password comprises the step of storing the first password in a predetermined non-volatile storage location on a storage medium in the data storage device.

14. The method of claim 13 wherein the step of comparing the two passwords comprises the steps of providing the first password from the predetermined storage location on the storage medium to a processor in the data storage device, and comparing the two passwords in the processor.

15. The method of claim 14 wherein the step of permitting access comprises the steps of providing from the processor an enable signal if the two passwords are the same, receiving a request for access to the data from the one of the systems, and allowing access to the data in the presence of the enable signal and the request for access.

16. A system for controlling access to data on a data storage device installed in a system, said data storage device comprising, a storage medium having a predetermined storage location for storing a first password, said storage location not being accessible from said system, means for receiving a second password, a comparator for comparing said first and second passwords, and for providing an enable signal when said first and second passwords are the same, means for denying access to said storage medium from said system in the absence of said enable signal; and said system comprising a data request interface for providing a request for access to data on said data storage device, and means for storing said second password only for so long as said system remains powered and for automatically providing said second password from said means for storing to said means for receiving responsive to an absence of said enable signal, where said enable signal was previously present.

17. The system of claim 16 wherein said system further comprises a volatile memory for storing said second password and a BIOS for automatically providing said second password from said volatile memory to said data storage device for comparison to the first password.

18. The system of claim 16 wherein said storage location further stores a fleet password, said means for receiving receives a second fleet password, and said comparator compares said first and second fleet passwords and provides said enable signal when said first and second fleet passwords are the same.

19. The system of claim 16 wherein said comparator and said means for denying access are implemented in firmware.

20. The system of claim 16 wherein said comparator comprises RAM for storing said first and second passwords, and a processor operatively connected to said RAM for comparing said first and second passwords.

21. The system of claim 16 wherein said means for denying access comprises a circuit between a read/write head of said data storage device and drive electronics for said data storage device, said circuit comprising a logical gate responsive to said enable signal.

22. The system of claim 16 wherein said data storage device comprises a hard drive.

\* \* \* \* \*